DEREVERBERATION BY SPECTRAL MEASUREMENT

Filed June 17, 1968 2 Sheets-Sheet 1

INVENTOR
BY J. L. FLANAGAN
C. E. Hirsch Jr.
ATTORNEY

DEREVERBERATION BY SPECTRAL MEASUREMENT

Filed June 17, 1968 2 Sheets-Sheet 2

United States Patent Office 3,542,954

Patented Nov. 24, 1970

3,542,954
DEREVERBERATION BY SPECTRAL MEASUREMENT

James L. Flanagan, Warren, N.J., assignor to Bell Telephone Laboratories, Incorporated, Murray Hill, N.J., a corporation of New York Filed June 17, 1968, Ser. No. 737,539
Int. Cl. G10l 1/00
U.S. Cl. 179—1 6 Claims

ABSTRACT OF THE DISCLOSURE

Multipath or reverberant distortion in an acoustic signal is reduced by receiving the signal at a plurality of spatially separated reception points and combining selected frequency components of the received signals to form a composite signal.

This invention relates to the processing of communication signals to reduce the effects of multipath or reverberant distortion.

BACKGROUND OF THE INVENTION

Field of the invention

Reverberant or multipath distortion is created when an acoustic signal traverses a plurality of different paths between its source and a receiving transducer. Such distortion is perceived primarily as frequency coloration and not as echo if the interpath delay differences are not too great. A few multipaths of significant amplitude with interpath delay differences of the order of ten milliseconds or less will produce the distortion which, analytically, appears as a series of nulls in the long time frequency spectrum of the received signal.

Multipath distortion of this sort occurs, for example, when a microphone is located in a small relatively hard walled room, as in a telephone conference system where a microphone and speaker are employed in a conference room in place of conventional telephone handsets. The quality of speech reproduction in such conference systems is seriously affected by distortion of this kind.

DESCRIPTION OF THE PRIOR ART

According to one proposal, multipath interference may be reduced by directly combining the output of two or more spatially separate microphones receiving different versions of the same signal. However, it has been found that direct combination of such signals actually compounds phase differences and thus increases spectral distortion. In a copending application Ser. No. 596,292, now Pat. No. 3,440,350, filed Aug. 1, 1966, a method is disclosed for processing signals from a number of spatially separated microphones to reduce multipath interference. However, this method employs apparatus similar to phase vocoder apparatus which may become complex and cumbersome.

Thus, it is an object of the present invention to reduce or eliminate the effects of multipath or reverberant distortion in a signal with relatively simple processing apparatus.

SUMMARY OF THE INVENTION

In attaining this and other objects and in accordance with the invention, the effects of multipath distortion in a communications signal are reduced by receiving the signal at a plurality of transducers located at spatially separated reception points. The received signals are normalized and are each divided into a plurality of subband channels corresponding to preselected contiguous frequency subranges. By comparing the long time frequency spectra of the signals received by each transducer the maximum signal in each subrange is selected. These maximum signals are then gated from the corresponding subband channels associated with the transducers at which they occur to a combining network. The combining network thus receives one signal in each subrange which it combines to form a composite signal.

BRIEF DESCRIPTION OF THE DRAWINGS

The invention will be fully apprehended from the following description of an illustrative embodiment thereof, taken in conjunction with the appended drawings in which.

DETAILED DESCRIPTION

Figure 1:
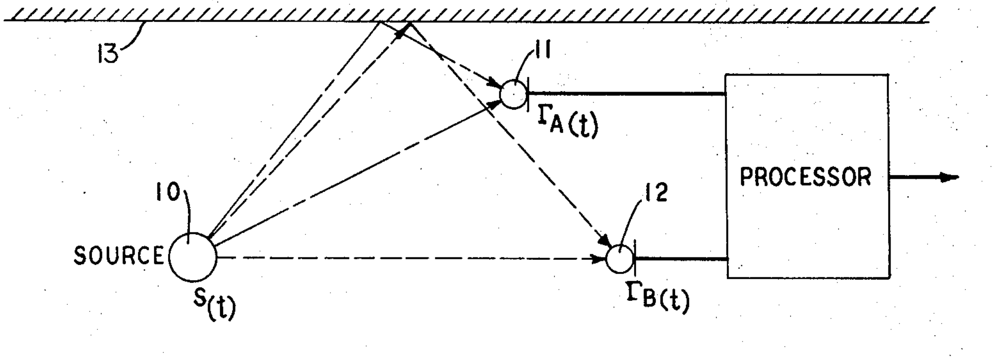
FIG. 1 shows two possible paths an acoustic signal may travel between its source and a pair of receiving transducers in the presence of a hard wall.

FIG. 1 shows a simplified multipath situation in which the invention is employed to reduce the effects of multipath distortion. Signal source, 10, produces an acoustic wave represented by the function $S(t)$. This wave may be any form of acoustic signal, but is most frequently a complex speech signal. If the wave is received at a single point it will contain significant frequency distortions resulting from multipath cancellation. To eliminate such distortion and in accordance with the invention, the wave is received by several spatially separated transducers 11 and 12, which convert the acoustic wave into several analog electrical signals. The analog outputs of the several transducers are applied to a processing network, to be described below, which forms a single composite replica of the acoustic signal while substantially reducing the effects of multipath distortion.

In the example in FIG. 1, each transducer is shown to be receiving the acoustic signal via two paths of different lengths: one path covering the direct distance between the signal source and the transducer, the other being reflected from a hard wall, 13. Of course, in an enclosed room allowing reflection from walls, floor and ceiling, the multipath situation becomes far more complex.

Figure 2A:
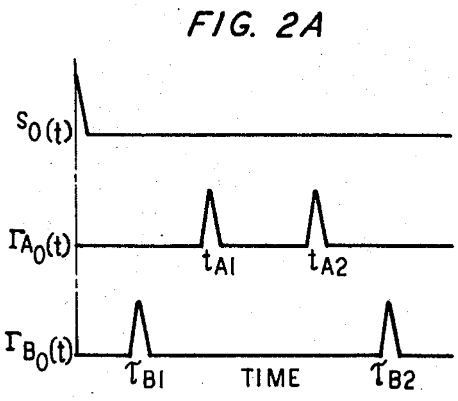
FIG. 2A shows waveforms for a transmitted signal and the signals received by two receiving transducers located as shown in FIG. 1.

The graph in FIG. 2A shows the electrical analog signals $r_{A0(t)}$ and $r_{B0(t)}$ produced by each of the transducers in response to an acoustic test signal $S_{0(t)}$ of the form shown. The test signal is in the form of a simple spike or pressure impulse to demonstrate the time delay differences produced by multipath transmission. Each transducer receives two separate versions of the test signal which differ not only in time but in amplitude. The interpath delay time between the two replicas of $S_{0(t)}$ received by transducer 11, $\tau_{A_2}-\tau_{A_1}$, is greater than the time between the two signals received by transducer 12, $\tau_{B_2}-\tau_{B_1}$, because the length difference between the direct and reflected paths to transducer 11 is greater than the length difference between the direct and reflected paths to transducer 12. Again, in an enclosed room the signal pattern received is far more complex with many versions of the transmitted signal overlapping one another.

Figure 2B:
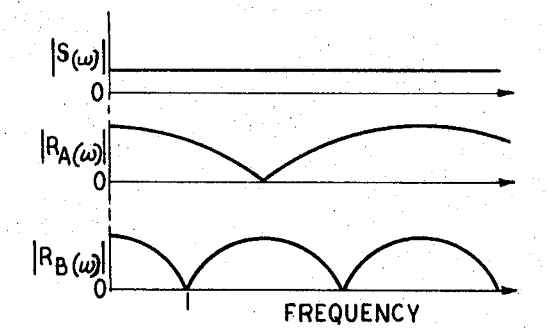
FIG. 2B shows the frequency spectrum of the transmitted signal $|S(\omega)|$ and the frequency spectrum of two received signals $|R_A(\omega)|$ and $|R_B(\omega)|$ developed by the arrangement shown in FIG. 1.

FIG. 2B shows the long time frequency spectrum $|R_A(\omega)|$ and $|R_B(\omega)|$ of the signal replicas produced by transducers 11 and 12 when the frequency spectrum of $S(t)$ is flat as shown by $|S(\omega)|$. The flat frequency spectrum $|S(\omega)|$ indicates equal amplitudes of all frequency components over the signal's frequency range. The nulls or depressions in $|R_A(\omega)|$ and $|R_B(\omega)|$ reveal that the amplitude of certain frequency components is attenuated by the cancellation effect of multipath transmission.

As the graphical data indicates, the location of nulls in the frequency spectra of the signals generated by transducers 11 and 12 are related to the interpath delay experienced by signals traveling from source 10 to the transducers. Thus, the distance between nulls in $|R_B(\omega)|$ is $2\pi/(\tau_{B_2}-\tau_{B_1})$. Since the interpath delays are different from location to location, the frequencies at which the nulls or zeros in the frequency spectrum occur differ for different transducer locations. In accordance with the invention, this fact can be advantageously exploited to eliminate multipath interference and produce a frequency spectrum closer to that of the original signal, by locating transducers at a number of spatially separated receiving points and extracting selected frequency components from the signals produced by each transducer to form a composite signal.

In one embodiment of the invention, this is accomplished by preselecting a number of contiguous frequency subranges, continuously analyzing each signal to determine for each subrange which transducer is receiving the maximum signal (according to a preselected criteria) in that subrange and transmitting that maximum signal from the transducer at which it occurs to a combining network. The combining network assembles the various maximum signals, one from each subrange, to form a composite signal with reduced frequency spectrum nulls. This embodiment of the invention will be described in more detail with regard to a system suitable for reducing multipath interference in a speech signal.

Figure 3:
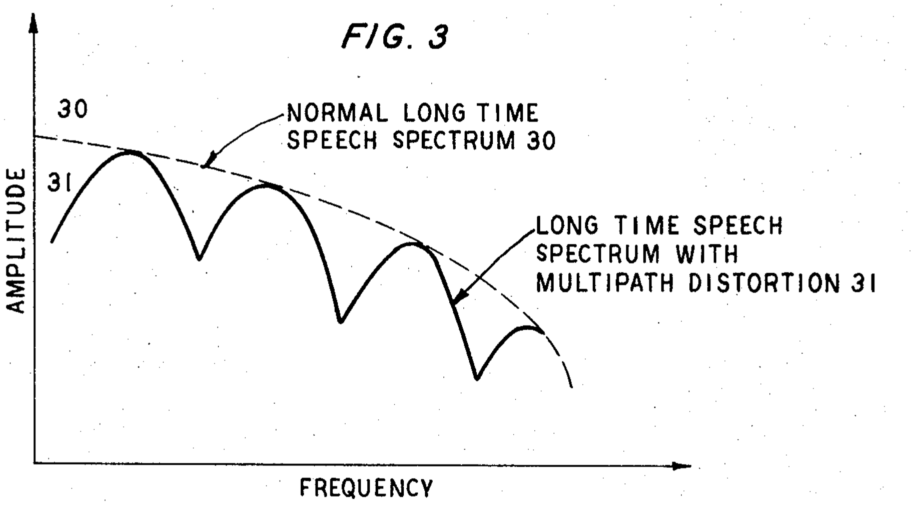
FIG. 3 shows the long time frequency spectrum of a speech signal transmitted from a stationary source to a stationary receiver through a multipath environment.

FIG. 3 shows the long time frequency spectrum of a normal speech wave: the dotted curve represents the normal frequency spectrum and the solid curve represents the frequency spectrum of a speech wave subject to multipath or reverberant distortion.

As is well known, the short time frequency spectrum of a speech wave includes formants or peaks and valleys which fluctuate in position from sound to sound. However the long time spectrum, for example the RMS sound pressure integrated over an interval on the order of a second, has most of the formants averaged out. This accounts for the smooth dashed curve 30 in FIG. 3. When a speech signal is transmitted over a multipath or other reverberant medium, the selective cancellation which occurs among the signals frequency components results in reverberant distortion. For relatively stationary source and receiver, the multipath distortion is relatively constant and the long time frequency spectrum is stable as shown by curve 31. The spectrum approximately follows the undistorted spectrum since the frequency content of the speech wave sets an approximate upper limit on the content of the distorted signal. However, the disturbed signal includes nulls which result from frequency component cancellation. If several spatially separated transducers are located in a reverberant environment, such as an enclosed room, the zeros or nulls in the various frequency spectra will occur at different frequencies. The apparatus shown in FIGS. 4 and 5 is employed to select and combine appropriate elements of each received signal to reduce multipath nulls.

Figure 4:
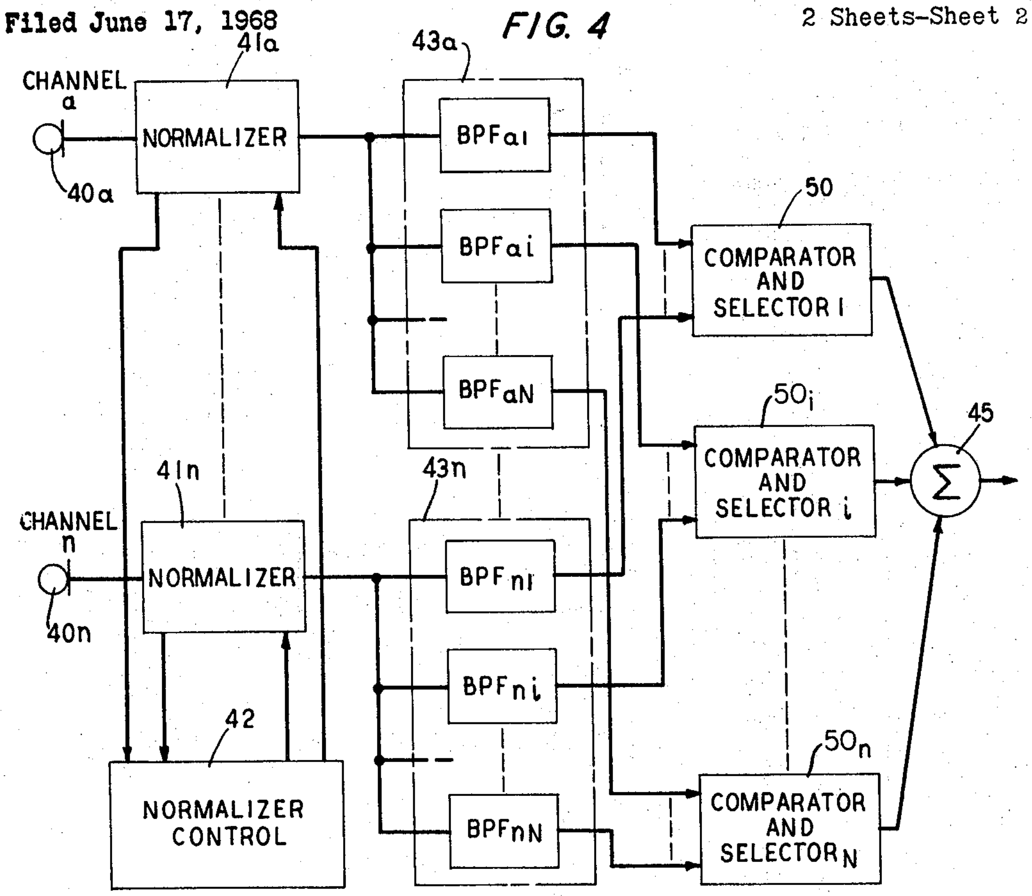
FIG. 4 shows apparatus constructed in accordance with the invention for reducing the effects of multipath distortion.
Figure 5:
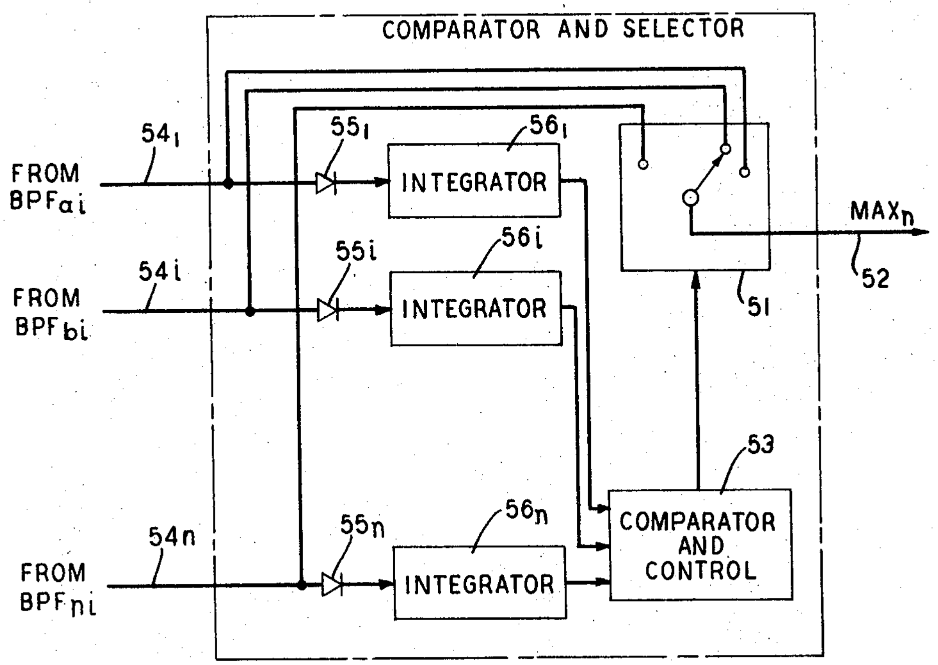
FIG. 5 shows a comparator and selector suitable for inclusion in the apparatus shown in FIG. 4

In the embodiment of the invention shown in FIG. 4, a plurality of microphones 40*a* through 40*n* are located at selected reception points within a receiving area. As indicated above, each reception point receives a different version of the transmitted signal. The amplitude range differences between the received signals are eliminated by normalizer networks 41*a* through 41*n* which are associated in a one-to-one correspondence with the microphones 40*a* to 40*n*. As will be seen, such normalization is required for meaningful amplitude comparisons of various frequency components to be made at a later stage of processing.

Each normalizer 41*a–n* includes an amplifier or attenuator and a signal sampling network, not shown. The gain of each amplifier or the degree of attenuation of each attenuator is individually controlled by normalizer control network 42 which continually monitors the signals produced by each microphone and determines, for example, the average power of each such signal sample. Network 42 feeds back appropriate control signals to the amplifier or attenuator in the normalizers and thus keeps the average power of each signal channel equal. For example, a normalizer which may be utilized for adjusting the gain in the present invention is described in patent 2,892,891 issued to J. M. Manley et al. on June 30, 1959. Accordingly, the power measuring and control circuitry for performing the above operations are well known in the signal processing art and will thus not be discussed in detail.

It is to be understood that the signals received by each transducer 40*a* through 40*n* may be normalized according to measures other than average power. For example, the received signals may be normalized to a level established by the maximum amplitude signal appearing in any one of the filter channels.

In accordance with this embodiment of the invention, the normalized signals developed by networks 41*a* through 41*n* are each divided into a plurality of contiguous frequency subbands by an array of contiguous frequency filters 43*a* to 43*n*. Each filter array includes N filters where N is selected according to the use to be made of the system. For a normal speech signal, approximately 20 filters could typically be used for each channel. The passbands of the various filters in each filter bank need not be equal, but are selected in accordance with the type of signal to be processed and the use to be made of the composite output signal. For a normal speech signal to be used in telephonic or similar communications passbands on the order of 100 Hz. up to 1000 Hz. and somewhat broader in width above 100 Hz. have been found best.

The filtered subband signal from the first bandpass filter in each filter bank ($BPF_{a1}$ . . . , $BPF_{n1}$) is directed to a first of N comparator and selector networks, 50. Similarly each signal in the $i^{th}$ subband range is directed to the $i^{th}$ comparator and selector, 50*i* for all $i$ from 1 to N. Thus, in each subrange 1 to N a comparator and selector continuously examines a measure of the long time average amplitude of each signal (for example, the RMS sound pressure integrated over times on the order of a second) and selects the maximum signal in subrange. A network suitable for such processing is shown in FIG. 5. This group of networks $\mathbf{50_1}$–$\mathbf{50_N}$ direct the maximum signal in each subrange to summing network 45 which linearly combines the various subrange components to form a composite signal with the multipath nulls substantially removed.

A comparator and selector network, 50, suitable for use in the apparatus shown in FIG. 4 is shown in FIG. 5. The $i^{th}$ such network receives $n$ subband signals, one from each of the $n$ filter banks: each subband signal representing the version of the $i^{th}$ subrange components received by the associated transducer. Network 50 includes a switching circuit 51 which is equipped to couple a selected one of the subrange signals to an output terminal 52. Switching network 51 is under control of network 53 which samples and compares the R subband signals according to a predetermined criteria and selects the largest. Network 53 then sends appropriate control signals to switch 51 which connects the appropriate one of the $n$ input leads $54_1$ to $54_n$ to the output terminal 52.

The predetermined criteria for selecting the best subrange signal may be built into the apparatus by including diodes $55_1$ through $55_n$ and integrators $56_1$ through $56_n$ in the path to network 53. The operation of such a series connection of diode and integrator is well known in the art to produce a measure of the long time power in a signal channel. Network 53 then samples this long time power measure at an appropriate rate and controls switch 51 as indicated above.

It is to be understood that other criteria may be used to select the most desirable subrange signal in appropriate cases.

It is to be understood that the above-described arrangement is merely illustrative of the numerous arrangements which may be devised from the principles of this invention by those skilled in the art without departing from the spirit and scope of the invention.

What is claimed is:

1. Apparatus for reducing the effects of multipath interference which comprises, means for receiving signals at each of a plurality of spatially separated locations, said signals being characterized by multipath interference frequency components and frequency components unaffected by multipath interference, means in circuit relationship with each of said receiving means for extracting said frequency components which are unaffected by multipath interference from said received signals, and means in circuit relationship with said extracting means for selectively combining said unaffected frequency components to form a composite speech signal.

2. Apparatus as defined in claim 1 wherein said means for extracting said unaffected frequency components includes means for dividing each received signal into a plurality of subchannels corresponding to selected contiguous frequency subranges, and means for selecting an individual one of said received signals in each subrange according to a predetermined criteria related to a predetermined characteristic of said received signals.

3. Apparatus as defined in claim 2 wherein said means for selecting said individual signal in each subrange includes means for measuring the long time average power of the signals in each subband.

4. Apparatus for dereverberating an acoustic signal comprising, a plurality of transducers located in spatially separate relation to one another, means in circuit relationship with each transducer for developing signals representative of the long time frequency spectra of signals at each transducer, means for dividing each of said signals representative of said spectra into a plurality of frequency ranges, means for identifying from said long time frequency spectra signals the transducer receiving the signal in each of said frequency ranges having the maximum average amplitude, a summer, and means for supplying selectively said signal having the maximum average amplitude in each frequency range to said summer.

5. Apparatus for reducing the effects of multipath distortion of communication signals comprising, a plurality of transducers for receiving signals at a plurality of spatially separated reception points, a plurality of normalizer means associated in a one-to-one circuit relationship with said transducers for eliminating amplitude range differences between said signals received at said plurality of transducers, a plurality of contiguous frequency filters arrayed in a plurality of filter banks, said filter banks being associated in a one-to-one circuit relationship with said normalizer means for separating each of the normalized received signals into a plurality of frequency subbands, power measuring means in a predetermined circuit relationship with each of said filters for measuring the long-time power of signals in similar frequency subbands, means for comparing signals representative of said power measurements to determine the signal having the maximum power in each of said subbands, signal combining means for summing the signals having the maximum power in each of said frequency subbands to form a composite signal, and switching means responsive to signals developed by said comparing means for supplying the signals having the maximum power in each of said subbands to said combining means.

6. Apparatus as defined in claim 5 wherein said normalizer means equalize the average signal power received at all of said reception points.

References Cited

UNITED STATES PATENTS

| | | | |
|---|---|---|---|
| 2,817,711 | 12/1957 | Feldman | 179—1 |
| 3,155,909 | 11/1964 | Shepherd | 325—304 |

KATHLEEN CLAFFY, Primary Examiner

W. OLMS, Assistant Examiner

U.S. Cl. X.R.

325—304